Figure 1:
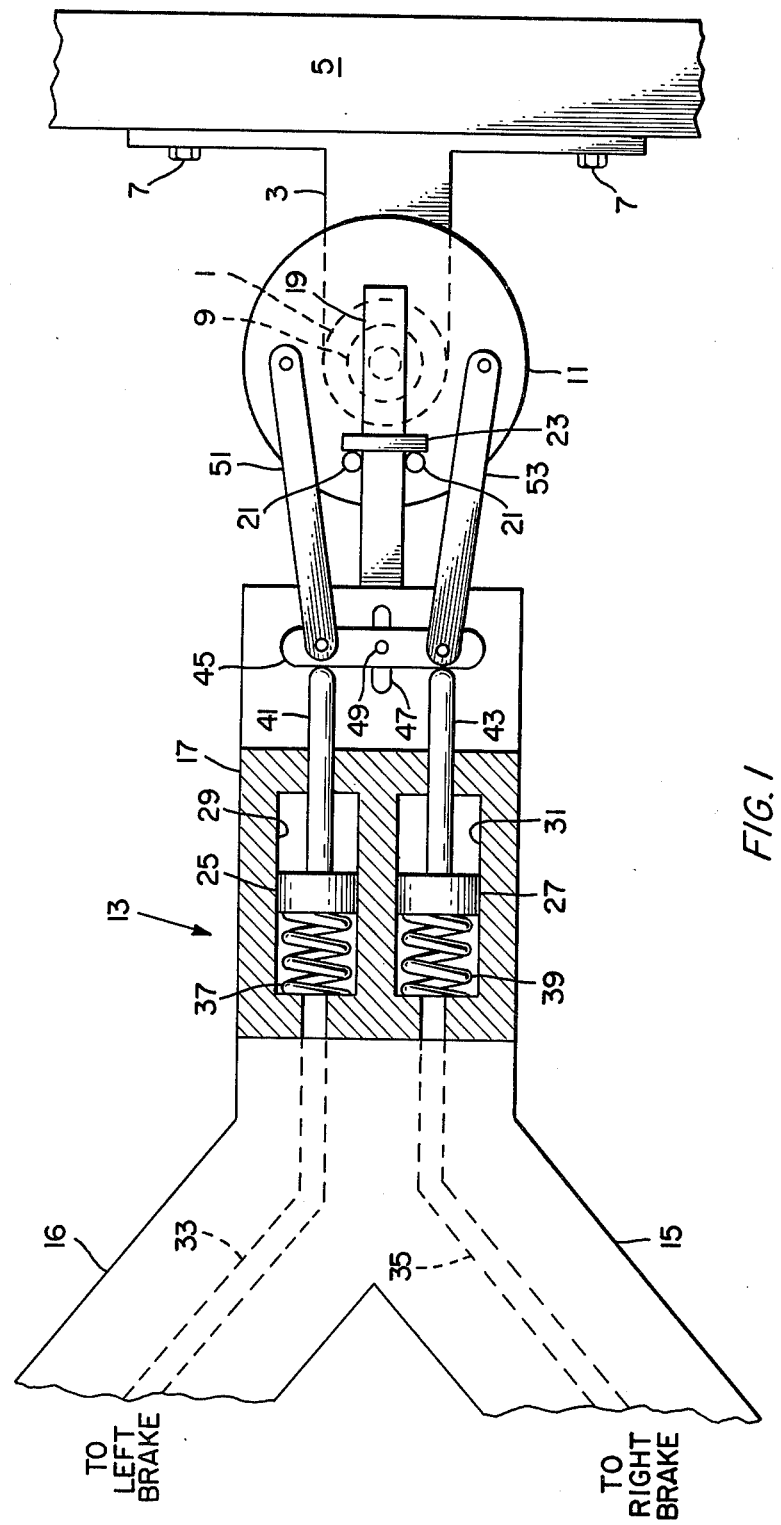

United States Patent
Presley et al.

[11] 3,948,544
[45] Apr. 6, 1976

[54] SURGE BRAKE COMBINATION VEHICLE STABILIZER

[75] Inventors: Rex Wallace Presley, Livonia; Jack Richardson Lorraine, Howell, both of Mich.

[73] Assignee: The Bendix Corporation, South Bend, Ind.

[22] Filed: Feb. 24, 1975

[21] Appl. No.: 552,084

[52] U.S. Cl. ......... 280/446 B; 180/103 BF; 188/112
[51] Int. Cl.² ............................................ B60T 7/20
[58] Field of Search ........... 280/446 B; 180/103, 83, 180/6.48; 188/112

[56] References Cited
UNITED STATES PATENTS

| | | | |
|---|---|---|---|
| 2,149,624 | 3/1939 | Owen | 188/112 |
| 3,288,240 | 11/1966 | Franzel | 280/446 B |
| 3,783,963 | 1/1974 | Erwin | 180/6.48 |
| 3,810,521 | 5/1974 | Sparr | 280/446 B |
| 3,819,234 | 6/1974 | Couchois | 180/103 |

*Primary Examiner*—Robert R. Song
*Assistant Examiner*—John A. Pekar
*Attorney, Agent, or Firm*—Leo H. McCormick, Jr.; S. H. Hartz

[57] ABSTRACT

Apparatus for automatically eliminating a sway condition of a trailer having surge brakes and towed by a tow vehicle. The hitch connects the trailer to the tow vehicle and has a reaction wheel for sensing hitch lateral force and for automatically controlling the trailer brakes to eliminate the sway condition.

10 Claims, 5 Drawing Figures

SURGE BRAKE COMBINATION VEHICLE STABILIZER

The invention relates to automatically stabilizing towed vehicles to avoid their inherent tendency to swerve when travelling at moderate or high speeds.

BACKGROUND OF THE INVENTION

It is well recognized that when a towed vehicle, such as a travel trailer, is towed behind a car or truck there is an inherent tendency to sway when travelling at moderate or high speeds, thus causing a hazardous or dangerous driving condition. This condition may be aggravated by travelling over uneven roadbeds, making sudden turns, encountering gusty winds and passing large vehicles, such as trucks, travelling at high speeds.

PRIOR ART

It is well known that applying the brakes of the towed vehicle will correct swaying of the towed vehicle and that the sooner corrective action takes place the greater the chance of avoiding a hazardous or dangerous condition. The time lag before applying the brakes is very critical because the first few moments of any swaying action of the trailer is extremely important in determining the total extent and magnitude of the sway condition.

In some arrangements the lateral acceleration of the trailer is detected and the brakes are applied when the lateral acceleration exceeds a predetermined magnitude. However, there is a serious delay in applying the trailer brakes and the swaying action of the trailer may assume dangerous proportions before corrective action is taken.

SUMMARY OF THE INVENTION

The present invention is directed to apparatus for operating hydraulic surge brakes on a trailer in response to hitch lateral force for automatically eliminating a sway condition. The apparatus operates the right brake on the trailer in response to hitch lateral forces toward the left (looking forwardly of the trailer) and operates the left brake on the trailer in response to right hitch lateral forces.

Hitch lateral forces reach substantial value before any other parameter and anticipate trailer sway. When the trailer brakes respond to hitch lateral forces the brakes are applied before the sway actually begins and thus avoid a dangerous swaying condition in the trailer.

The invention contemplates apparatus for automatically eliminating a sway condition in a trailer towed by a tow vehicle and having brakes for retarding its rate of movement, comprising a hitch connecting the trailer to the tow vehicle, sensing means on the hitch for sensing the amplitude and direction of hitch lateral force, and means connected to the sensing means for operating the trailer brakes for automatically eliminating a sway condition in the trailer.

DRAWINGS

Figure 2:
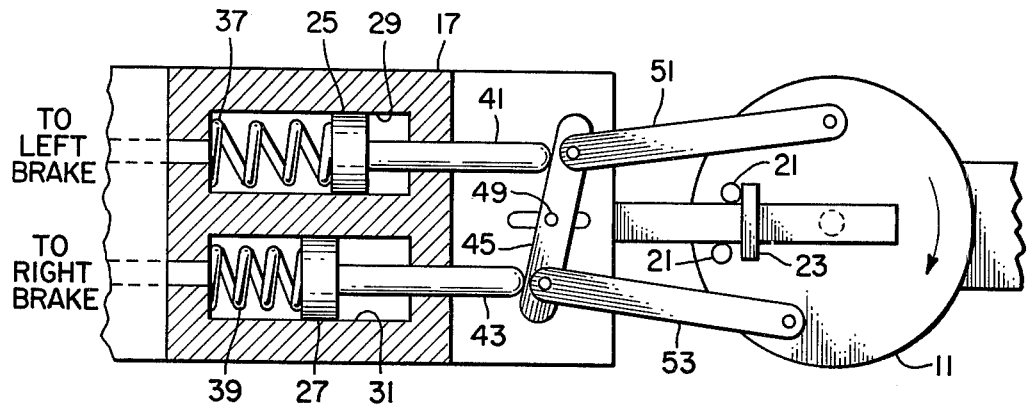
Figure 3:
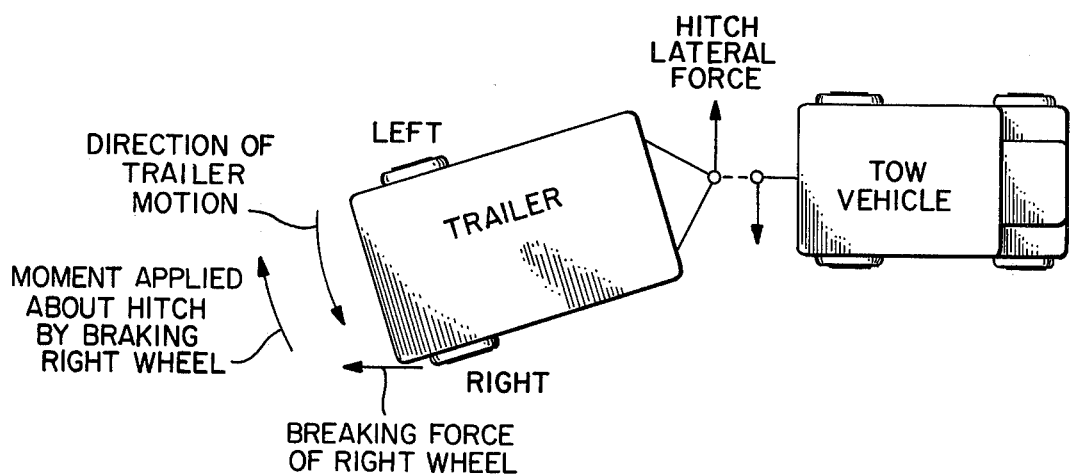
Figure 4:
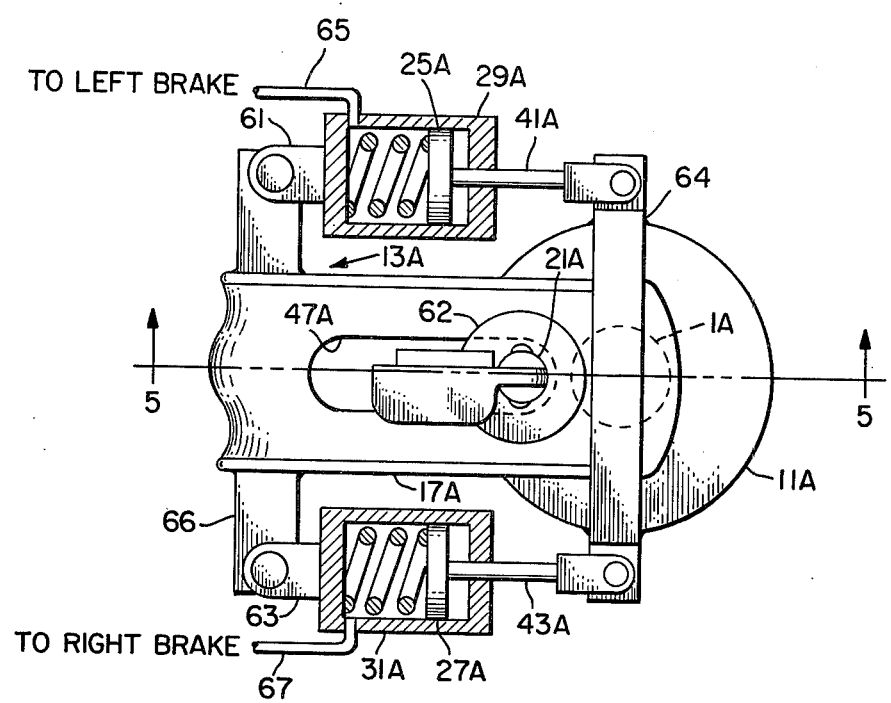
Figure 5:
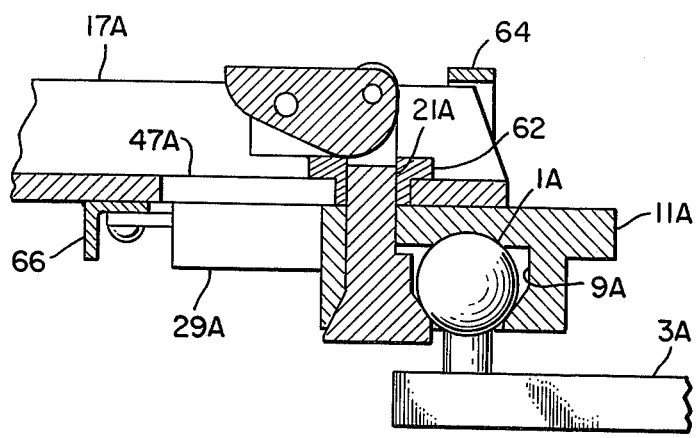

FIG. 1 is a top view of a hitch showing one embodiment of the invention for coupling a trailer to a towing vehicle, FIG. 2 is a view similar to FIG. 1 showing application of the trailer brakes to correct a sway condition, FIG. 3 is a schematic force diagram of a tractor and tow vehicle when a hitch lateral force occurs, FIG. 4 is a top view of a hitch showing a second embodiment of the invention, and FIG. 5 is a sectional view taken approximately on the line 5—5 of FIG. 4.

DETAILED DESCRITPION OF THE INVENTION

Referring to FIG. 1 shown therein is a novel trailer hitch constructed according to the invention for attaching a trailer to an automotive vehicle. The hitch includes a conventional ball 1 mounted on a bracket 3 secured to the automotive vehicle bumper 5 by screws 7 in the usual manner. A conventional ball socket 9 is attached to ball 1 and permits the trailer to rotate about the yaw and pitch axis. A reaction wheel 11 is secured to ball socket 9.

A wye shaped member 13 has arms 15 and 16 secured to the trailer and a tongue 17 with an extension 19 mounted on reaction wheel 11 between a pair of guide pins 21 secured to the reaction wheel. A bar 23 is attached transversely to extension 19 and engages guide pins 21 when the tow vehicle is pulling the trailer.

The trailer brakes are operated hydraulically by pistons 25 and 27 which reciprocate in cylinders 29 and 31, respectively, in tongue 17. Cylinder 29 is connected to the left brake on the trailer by a passage 33 in tongue 17 and arm 16. Cylinder 31 is connected to the right brake by a passage 35 in tongue 17 and arm 15. Springs 37 and 39 urge pistons 25 and 27 in cylinders 29 and 31, respectively, forwardly of the trailer so that piston rods 41 and 43 on pistons 25 and 27, respectively, engage a crank 45. The crank is pivotally and slidably mounted on tongue 17 by means of a pin 49 in a slot 47 in the tongue. Reaction levers 51 and 53 are pivotally attached to the ends of crank 45 and to opposite sides of reaction wheel 11.

OPERATION

As the tow vehicle pulls the trailer, bar 23 on extension 19 engages guide pins 21 and no braking force is applied to the wheels of the trailer. When the tow vehicle brakes are applied the trailer inertia causes tongue 17 to move forwardly toward the ball hitch while the mean distance from pistons 25 and 27 to the ball hitch remains fixed so that pressure is applied equally to both trailer brakes if there is no hitch lateral force.

Hitch lateral forces are applied to the reaction wheel at guide pins 21 and at the center of the reaction wheel. As shown in FIG. 3, which is a diagram of forces on the trailer and tow vehicle when a sway condition occurs, hitch lateral forces toward the left rotate reaction wheel 11 in a clockwise direction as shown in FIG. 2 causing levers 51 and 53 to pivot crank 45. If the trailer brakes are being applied as described above, the crank positions piston 27 to increase the right brake pressure and positions piston 25 to decrease the left brake pressure thus producing a stabilizing moment to eliminate the sway condition. The moment applied to reaction wheel 11 by levers 51 and 53 is equal and opposite to the moment from hitch lateral force.

Similarly, hitch lateral forces toward the right rotate reaction wheel 11 in a counter-clockwise direction to position piston 25 to increase the left brake pressure and position piston 27 to decrease the right brake pressure thus producing a stabilizing moment to eliminate the sway condition. Since no torque is required to rotate the ball hitch the differential brake pressure is not a function of trailer yaw angle. The differential brake pressure is a function of the reaction level force and the piston area.

If a hitch lateral force occurs while the brakes are not being applied manually, then rotation of crank 29 operates one of the pistons to apply the appropriate brake to eliminate the sway condition.

A second embodiment of the invention is shown in FIGS. 4 and 5. The hitch has a ball 1a mounted on a bracket 3a secured to the motor vehicle. A socket 9a on reaction wheel 11a is rotatably supported by ball 1a. A tongue 17a is mounted on reaction wheel 11a. A circular member 62 is mounted on a pin 21a secured to reaction wheel 11a and is received in a slot 47a in tongue 17a to permit relative longitudinal movement of the tongue and reaction wheel. The hitch operates in the same manner as the embodiment shown in FIGS. 1 and 2 but differs structurally from the embodiment of FIGS. 1 and 2 in that piston rods 41a and 43a for operating pistons 25a and 27a, respectively, are pivoted on a bracket 64 secured to reaction wheel 11a. Also, cylinders 29a and 31a are pivotally attached to the ends of a bracket 66 on tongue 17a by levers 61 and 63, respectively. Cylinders 29a and 31a are operatively connected to the left and right brakes by suitable flexible connectors 65 and 67, respectively.

Hitch lateral forces rotate reaction wheel 11a to move pistons 25a and 27a in opposite directions in their respective cylinders and increase the braking force on one of the wheels and decrease the braking force on the other wheel if the tow vehicle brakes are being applied. Otherwise, the brake on one wheel only is applied as described above.

A hitch constructed according to the invention improves the stability of a combination vehicle making it easy to control and safe at high speeds because the trailer will not jack knife even under adverse conditions.

What is claimed is:

1. Apparatus for automatically eliminating a sway condition in a trailer towed by a tow vehicle and having brakes for retarding its rate of movement, comprising a hitch connecting the trailer to the tow vehicle, sensing means on the hitch for sensing the amplitude and direction of hitch lateral force, the sensing means including a reaction wheel and means for rotating the reaction wheel through an angle corresponding to hitch lateral force, and means connected to the sensing means for operating the trailer brakes for automatically eliminating a sway condition in the trailer including a pair of pistons reciprocating in associated cylinders operatively connected to the brakes, and means connecting the pistons to the reaction wheel for moving the pistons differentially in the cylinders in response to movement of the reaction wheel to operate the brakes for eliminating the sway condition in the trailer.

2. Apparatus for automatically eliminating a sway condition in a trailer as described in claim 1 in which the brake differential operating means has means for increasing the braking force on one wheel and decreasing the braking force on the other wheel when the brakes are otherwise applied.

3. Apparatus for automatically eliminating a sway condition in a trailer vehicle as described in claim 2 in which the braking force is increased on the wheel at the side of the trailer opposite the direction of hitch lateral force and the braking force is decreased on the wheel at the side of the trailer in the direction of hitch lateral force.

4. Apparatus for automatically eliminating a sway condition in a trailer vehicle as described in claim 1 in which the brake operating means applies braking force on one wheel.

5. Apparatus for automatically eliminating a sway condition in a trailer vehicle as described in claim 4 in which the brake operating means applies braking force on the wheel on the right side of the trailer vehicle when the trailer sways to the right and applies the braking force on the wheel on the left side of the trailer when the trailer sways to the left.

6. Apparatus for automatically eliminating a sway condition in a trailer vehicle as described in claim 1 in which the means for operating the trailer brakes has means for operating both trailer brakes equally in the absence of hitch lateral force when movement of a tow vehicle is retarded.

7. Apparatus for automatically eliminating a sway condition in a trailer vehicle as described in claim 1 in which the means for differentially moving the pistons includes levers connected to the reaction wheel at opposite sides thereof.

8. Apparatus for automatically eliminating a sway condition in a trailer vehicle as described in claim 7 in which the levers are connected directly to the pistons.

9. Apparatus for automatically eliminating a sway condition in a trailer vehicle as described in claim 7 in which the means for differentially moving the piston includes a crank operatively connected to the levers and to the pistons.

10. Apparatus for automatically eliminating a sway condition in a trailer vehicle as described in claim 1 in which the means for differentially moving the pistons includes a crank mounted by a pivot to the trailer hitch and a pair of levers connected to the crank at opposite sides of the pivot and to opposite sides of the reaction wheel and connecting means between the crank and pistons for differentially operating the pistons.

* * * * *